(12) United States Patent  
Chun et al.

(10) Patent No.: US 7,826,855 B2
(45) Date of Patent: Nov. 2, 2010

(54) DATA TRANSMISSION METHOD AND DATA RETRANSMISSION METHOD

(75) Inventors: Sung Duck Chun, Anyang-si (KR); Young Dae Lee, Anyang-si (KR); Sung Jun Park, Anyang-si (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 12/432,689

(22) Filed: Apr. 29, 2009

(65) Prior Publication Data

US 2009/0274098 A1 Nov. 5, 2009

Related U.S. Application Data

(63) Continuation of application No. 12/158,646, filed as application No. PCT/KR2007/000022 on Jan. 3, 2007.

(60) Provisional application No. 60/757,063, filed on Jan. 5, 2006, provisional application No. 60/784,976, filed on Mar. 22, 2006, provisional application No. 60/797,402, filed on May 2, 2006, provisional application No. 60/815,722, filed on Jun. 21, 2006.

(30) Foreign Application Priority Data

Dec. 22, 2006 (KR) .................... 10-2006-0132469

(51) Int. Cl.
*H04W 88/02* (2009.01)
(52) U.S. Cl. .................................................. 455/455

(58) Field of Classification Search ................. 370/328, 370/321, 352, 346, 394, 473, 241, 282; 714/749; 455/67.11, 452.2, 455, 464
See application file for complete search history.

(56) References Cited

U.S. PATENT DOCUMENTS 5,659,756 A 8/1997 Hefferon et al.

(Continued)

FOREIGN PATENT DOCUMENTS

AU 2007-212916 8/2007

(Continued)

OTHER PUBLICATIONS

Hua Xu et al., Performance Analysis on the Radio Link Control Protocol of UMTS System, Jul. 31, 2001, IEEE Publication, pp. 2026-2030 (http://ieeexplore.ieee.org/stamp/stamp.jsp?tp=&arnumber=1040574&userType=inst).*

(Continued)

*Primary Examiner*—Diane Mizrahi
(74) *Attorney, Agent, or Firm*—Lee, Hong, Degerman, Kang & Waimey

(57) ABSTRACT

A method which can reduce loss in data transmission is provided. A data block is prepared in a high-level layer and the data block is transmitted in a low-level layer. Status report information associated with reception or non-reception of the data block is received through the low-level layer. When a receiver fails to receive data transmitted from a transmitter, the transmitter can rapidly recognize the reception failure and can retransmit the data.

12 Claims, 9 Drawing Sheets

U.S. PATENT DOCUMENTS

| | | | |
|---|---|---|---|
| 5,828,677 A | 10/1998 | Sayeed et al. | |
| 6,088,342 A | 7/2000 | Cheng et al. | |
| 6,317,430 B1 | 11/2001 | Knisely et al. | |
| 6,330,448 B1 | 12/2001 | Otsuka et al. | |
| 6,381,229 B1 | 4/2002 | Narvinger et al. | |
| 6,480,525 B1 | 11/2002 | Parsa et al. | |
| 6,571,102 B1 | 5/2003 | Hogberg et al. | |
| 6,597,668 B1 | 7/2003 | Schafer | |
| 6,597,675 B1 | 7/2003 | Esmailzadeh et al. | |
| 6,621,796 B1 | 9/2003 | Miklos | |
| 6,643,275 B1 | 11/2003 | Gustafsson et al. | |
| 6,728,225 B1 | 4/2004 | Ozluturk | |
| 6,795,412 B1 | 9/2004 | Lee | |
| 6,907,015 B1 | 6/2005 | Moulsley et al. | |
| 6,947,394 B1* | 9/2005 | Johansson et al. | 370/282 |
| 6,950,420 B2 | 9/2005 | Sarkkinen et al. | |
| 6,965,580 B1 | 11/2005 | Takagi et al. | |
| 7,075,971 B2 | 7/2006 | Parsa et al. | |
| 7,430,206 B2 | 9/2008 | Terry et al. | |
| 7,436,801 B1 | 10/2008 | Kanterakis | |
| 7,496,113 B2 | 2/2009 | Cai et al. | |
| 7,664,059 B2* | 2/2010 | Jiang | 370/282 |
| 2001/0024956 A1 | 9/2001 | You | |
| 2002/0009129 A1 | 1/2002 | Choi et al. | |
| 2002/0021698 A1 | 2/2002 | Lee et al. | |
| 2002/0021714 A1 | 2/2002 | Seguin | |
| 2002/0032884 A1 | 3/2002 | Kobata et al. | |
| 2002/0044527 A1 | 4/2002 | Jiang et al. | |
| 2002/0071480 A1 | 6/2002 | Marjelund | |
| 2002/0090004 A1 | 7/2002 | Rinchiuso | |
| 2002/0093940 A1 | 7/2002 | Toskala et al. | |
| 2002/0160744 A1 | 10/2002 | Choi et al. | |
| 2002/0181436 A1 | 12/2002 | Mueckenheim et al. | |
| 2002/0187789 A1 | 12/2002 | Diachina et al. | |
| 2002/0191559 A1 | 12/2002 | Chen et al. | |
| 2003/0076812 A1 | 4/2003 | Benedittis | |
| 2003/0103476 A1 | 6/2003 | Choi et al. | |
| 2003/0149371 A1 | 8/2003 | Shiga et al. | |
| 2003/0223393 A1 | 12/2003 | Lee et al. | |
| 2003/0236085 A1 | 12/2003 | Ho | |
| 2004/0008658 A1 | 1/2004 | Dahlman et al. | |
| 2004/0014452 A1 | 1/2004 | Lim | |
| 2004/0028078 A1 | 2/2004 | Beckmann et al. | |
| 2004/0077357 A1 | 4/2004 | Nakada | |
| 2004/0114606 A1 | 6/2004 | Haddad | |
| 2004/0117860 A1 | 6/2004 | Yi et al. | |
| 2004/0157602 A1 | 8/2004 | Khawand | |
| 2004/0185860 A1 | 9/2004 | Marjelund et al. | |
| 2004/0198369 A1 | 10/2004 | Kwak | |
| 2004/0202140 A1 | 10/2004 | Kim et al. | |
| 2004/0208160 A1 | 10/2004 | Petrovic et al. | |
| 2005/0014508 A1 | 1/2005 | Moulsley et al. | |
| 2005/0020260 A1 | 1/2005 | Jeong et al. | |
| 2005/0025039 A1 | 2/2005 | Hwang et al. | |
| 2005/0026623 A1 | 2/2005 | Fisher | |
| 2005/0041573 A1 | 2/2005 | Eom et al. | |
| 2005/0157696 A1 | 7/2005 | Yamamoto | |
| 2005/0185608 A1 | 8/2005 | Lee et al. | |
| 2005/0249141 A1 | 11/2005 | Lee et al. | |
| 2005/0250500 A1 | 11/2005 | Xu | |
| 2005/0260997 A1 | 11/2005 | Korale et al. | |
| 2005/0271025 A1 | 12/2005 | Guethaus et al. | |
| 2005/0281212 A1 | 12/2005 | Jeong et al. | |
| 2005/0288026 A1 | 12/2005 | Byun et al. | |
| 2006/0025079 A1 | 2/2006 | Sutskover et al. | |
| 2007/0140115 A1 | 6/2007 | Bienas et al. | |
| 2007/0147326 A1 | 6/2007 | Chen | |
| 2007/0206531 A1 | 9/2007 | Pajukoski et al. | |
| 2008/0095105 A1 | 4/2008 | Sundberg et al. | |
| 2008/0298322 A1 | 12/2008 | Chun et al. | |
| 2009/0175241 A1* | 7/2009 | Ohta et al. | 370/331 |
| 2010/0014430 A1 | 1/2010 | Oka | |
| 2010/0034095 A1* | 2/2010 | Ho et al. | 370/241 |
| 2010/0105334 A1* | 4/2010 | Terry et al. | 455/67.11 |

FOREIGN PATENT DOCUMENTS

| | | |
|---|---|---|
| EP | 0617875 | 12/1997 |
| EP | 1041850 | 4/2000 |
| EP | 1009184 | 6/2000 |
| EP | 1041850 | 10/2000 |
| EP | 1148735 | 10/2001 |
| EP | 1261222 | 11/2002 |
| EP | 1304898 | 4/2003 |
| EP | 1361514 | 11/2003 |
| EP | 1392074 | 2/2004 |
| EP | 1496639 | 1/2005 |
| EP | 1557968 | 7/2005 |
| EP | 1599063 | 11/2005 |
| EP | 1599063 A1 | 11/2005 |
| EP | 1605724 | 12/2005 |
| EP | 1684538 | 7/2006 |
| KR | 10-2001-0111637 | 12/2001 |
| KR | 20010111637 | 12/2001 |
| KR | 1020010111634 | 12/2001 |
| KR | 1020040048675 | 6/2004 |
| KR | 1020040064867 | 7/2004 |
| KR | 1020040089937 | 10/2004 |
| RU | 2168278 | 5/2001 |
| RU | 2191479 | 10/2002 |
| RU | 2232469 | 7/2004 |
| RU | 2232477 | 7/2004 |
| RU | 2237380 | 9/2004 |
| RU | 2270526 | 2/2006 |
| WO | 84/02021 | 5/1984 |
| WO | 99-44383 | 9/1999 |
| WO | 99-63713 | 12/1999 |
| WO | 99/63713 A1 | 12/1999 |
| WO | 02-03720 | 1/2002 |
| WO | 02-39760 | 5/2002 |
| WO | 0239760 A2 | 5/2002 |
| WO | 0247417 A1 | 6/2002 |
| WO | 02/075442 | 9/2002 |
| WO | 02-102110 | 12/2002 |
| WO | 03007636 A1 | 1/2003 |
| WO | 03-017691 | 2/2003 |
| WO | 03017691 A2 | 2/2003 |
| WO | 03/043259 | 5/2003 |
| WO | 03-043259 | 5/2003 |
| WO | 03043259 A1 | 5/2003 |
| WO | 03056723 A1 | 7/2003 |
| WO | 2003-096571 | 11/2003 |
| WO | 2004-034656 | 4/2004 |
| WO | 2004034656 A2 | 4/2004 |
| WO | 2004045234 | 5/2004 |
| WO | 2004-075442 | 9/2004 |
| WO | 2004-089030 | 10/2004 |
| WO | 2005-055472 | 6/2005 |
| WO | 2005074312 A1 | 8/2005 |
| WO | 2005088886 A1 | 9/2005 |
| WO | 2005-099125 | 10/2005 |
| WO | 2005-125125 | 12/2005 |
| WO | 2007/133034 | 11/2007 |

OTHER PUBLICATIONS

Ericsson, "E-UTRA Random Access," TSG-RAN WG1 #43, R1-051445, Nov. 7, 2005.

F.A. Zdarsky et al., "Handover in Mobile Communication Networks: Who is in Control Anyway?," Proceedings of the 30th EUROMICRO Conference, Aug. 2004, XP-10723593A.

LG Electronics Inc., "Framing in the MAC Entity," 3GPP TSG-RAN WG2 #52, R2-061012, Mar. 2006.

LG Electronics Inc., "HARQ and ARQ Operation," 3GPP TSG-RAN WG2 #50, R2-060106, Jan. 2006.

R.T. Derryberry et al., "On CDMA 2000 Evolution—Reverse High-Speed Packet Data Physical Layer Enhancements in CDMA 2000 1xEV-DV," IEEE Communications Magazine, Apr. 2005, vol. 43, No. 4, pp. 41-47, XP-001228792.

J. Chung et al., "Packet Synchronization and Identification for Incremental Redundancy Transmission in FH-CDMA Systems," Third IEEE International Symposium on Personal, Indoor, and Mobile Radio Communications, Oct. 1992, pp. 292-295, XP-010107082.

H. Xu et al., "Performance Analysis on the Radio Link Control Protocol of UMTS System," IEEE Publication, Jul. 2001, pp. 2026-2030.

Huawei: "Further Considerations on Multiplexing Method of Shared Control Channel in Uplink Single-Carrier FDMA", 3GPP TSG-RAM WG1, R1-051430 [online], Nov. 7, 2005 [retrieved on Jul. 24, 2008]. Retrieved from the Internet: <http://www.3gpp.org/ftp/TSG_RAN/WG1_RL1/TSGR1_43/Docs/R1-051430.zip> pp. 1-6.

NTT Docomo et al.: :Multiplexing Method of Shared Control Channel in Uplink Single-Carrier FDMA Radio Access, 3GPP TSG-RAN WG1, R1-051143 [online], Oct. 10, 2005 [retrieved on Jul. 24, 2008]. Retrieved from the Internet: <http://www.3gpp.org/ftp/tsg_ran/wg1_rl1/TSGR1_42bis/Docs/R1-051143.zip> pp. 1-8.

Philips: "Evolved Paging Indicators for LTE", 3GPP TSG-RAN WG2, R2-052985 [online], Nov. 7, 2005 [retrieved on Aug. 25, 2008]. Retrieved from the Internet: <http://www.3gpp.org/FTP/tsg_ran/WG2_RL2/TSGR2_49/Documents/R-052985.zip> pp. 1, 2.

Sarkar, S. et al. Common-Channel Soft Handoff in cdma2000-The Paging Channel. IEEE Transactions on Microwave Theory and Techniques. Jun. 2000, vol. 48, No. 6, pp. 938 to 950, XP011037998, ISSN 0018-9480. abstract, section IV.

NTT Docomo, et al.: "Paging Channel Structure for E-UTRA Downlink", 3GPP TSG-RAN WG1, R1-060034 [online], Jan. 23, 2006 [retrieved on Aug. 25, 2008]. Retrieved from the Internet: <http://www.3gpp1.org/ftp/tsg_ran/WG1_RL1/TSGR1_AH/LTE_AH_January-06/Docs/R1-060034.zip> pp. 1-5.

Motorola: "Paging Channel Design for E-UTRA", 3GPP TSG-RAN WG1, R1-061712 [online], Jun. 27, 2006 [retrieved on Aug. 25, 2008]. Retrieved from the Internet: <http://www.3gpp1.org/ftp/tsg_ran/WG1_RL1/TSGR1_AH/LTE_AH_June-06/Docs/R1-061712.zip> pp. 1-3.

LG Electronics Inc.: "Framing in the MAC entity", 3GPP TSG-RAN WG2, R2-061012, Mar. 27-31, 2006.

LG Electronics Inc.: "HARQ and ARQ Operation", 3GPP TSG-RAN WG2, R2-060106, Jan. 9-13, 2006.

* cited by examiner

[Fig. 1]
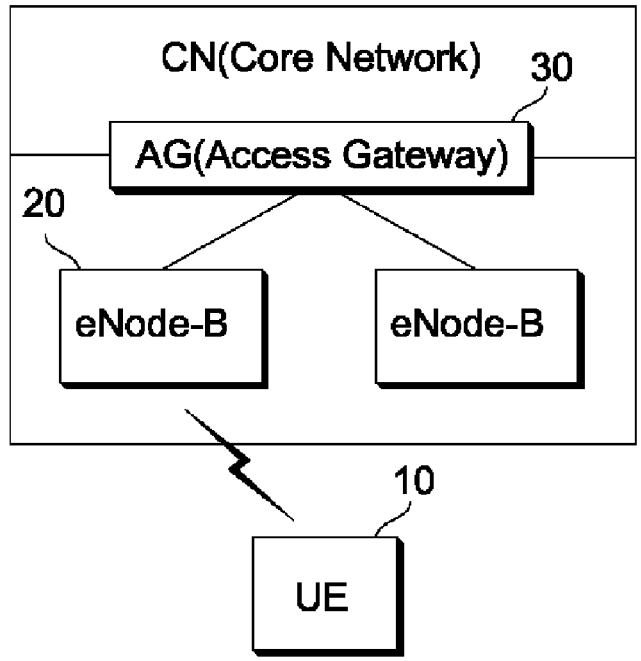
[Fig. 2]
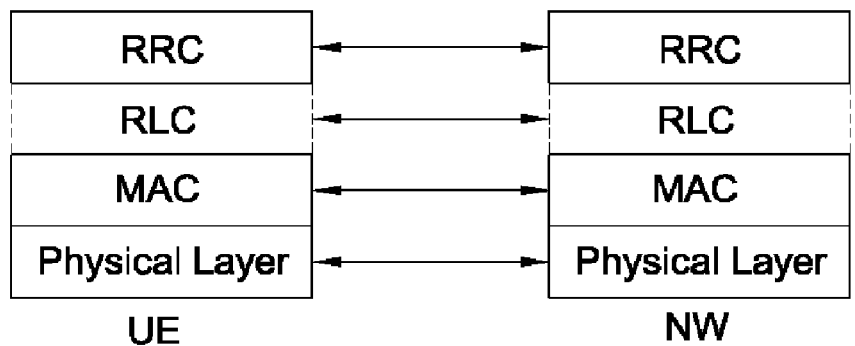
[Fig. 3]
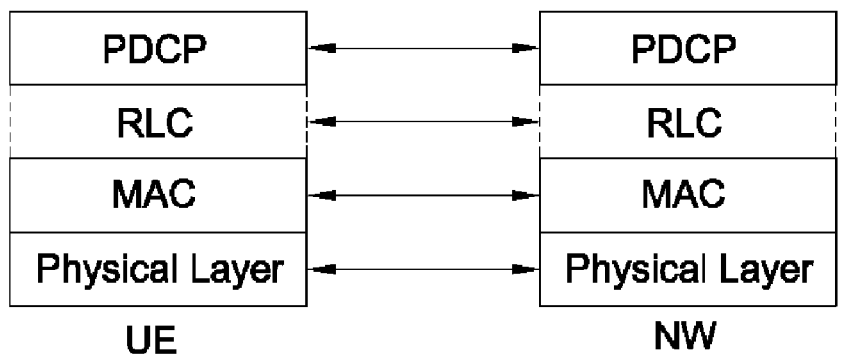

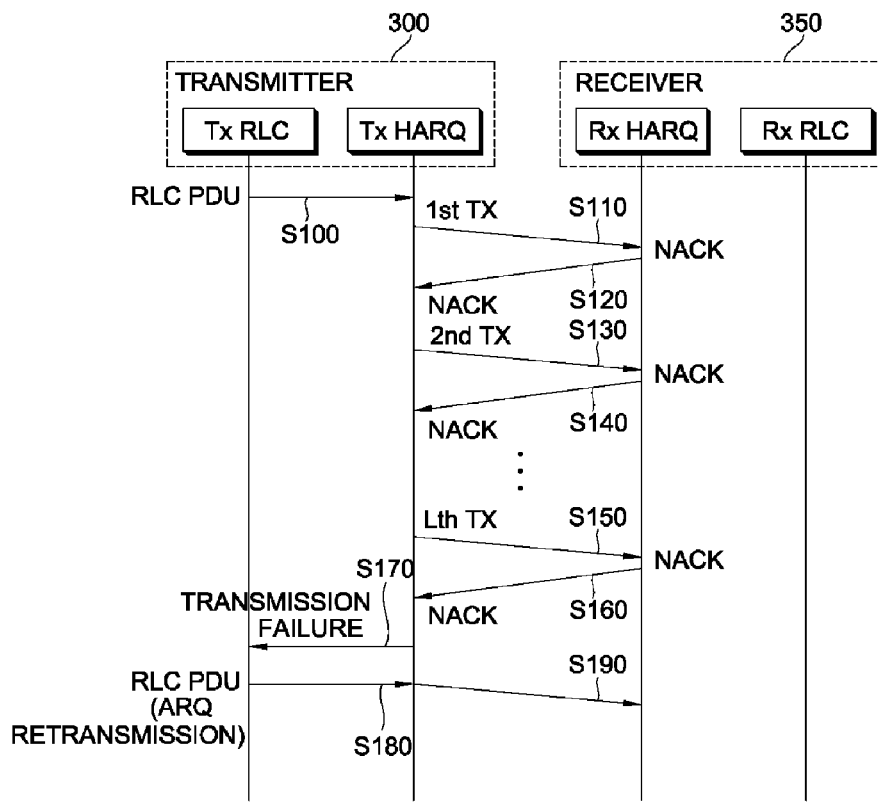
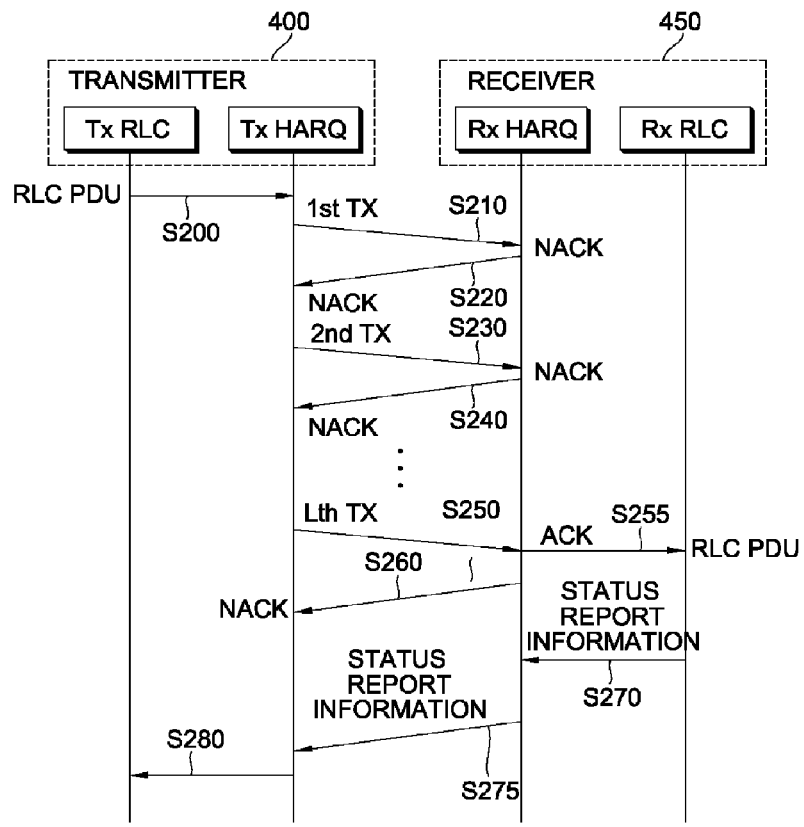

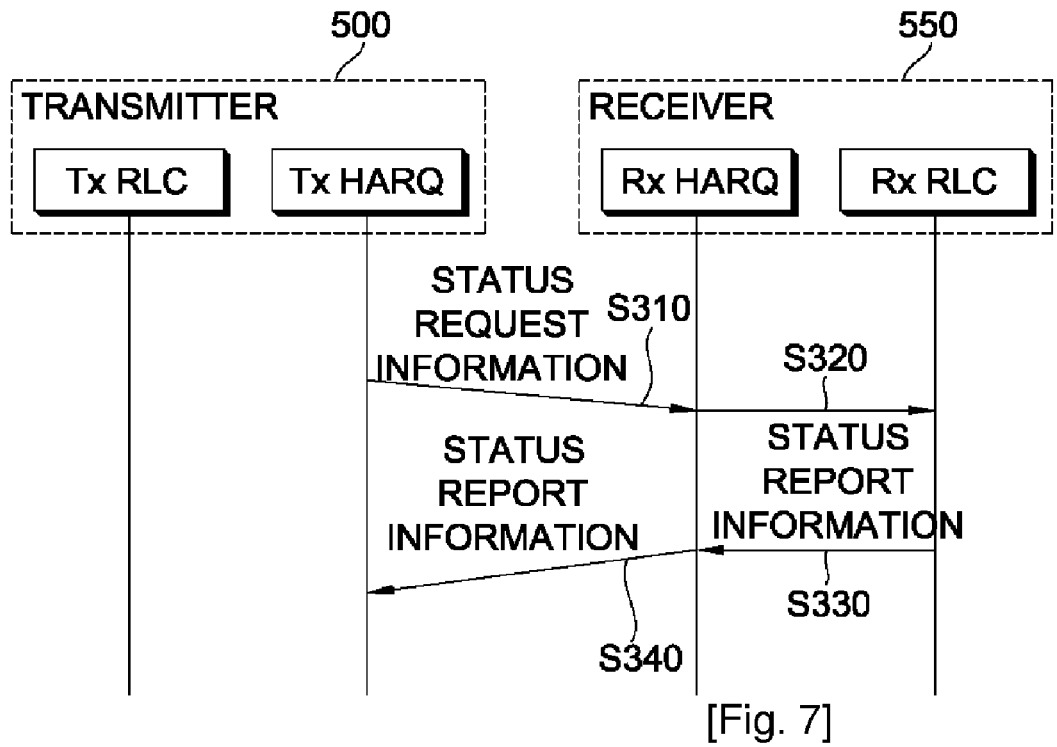
[Fig. 6]
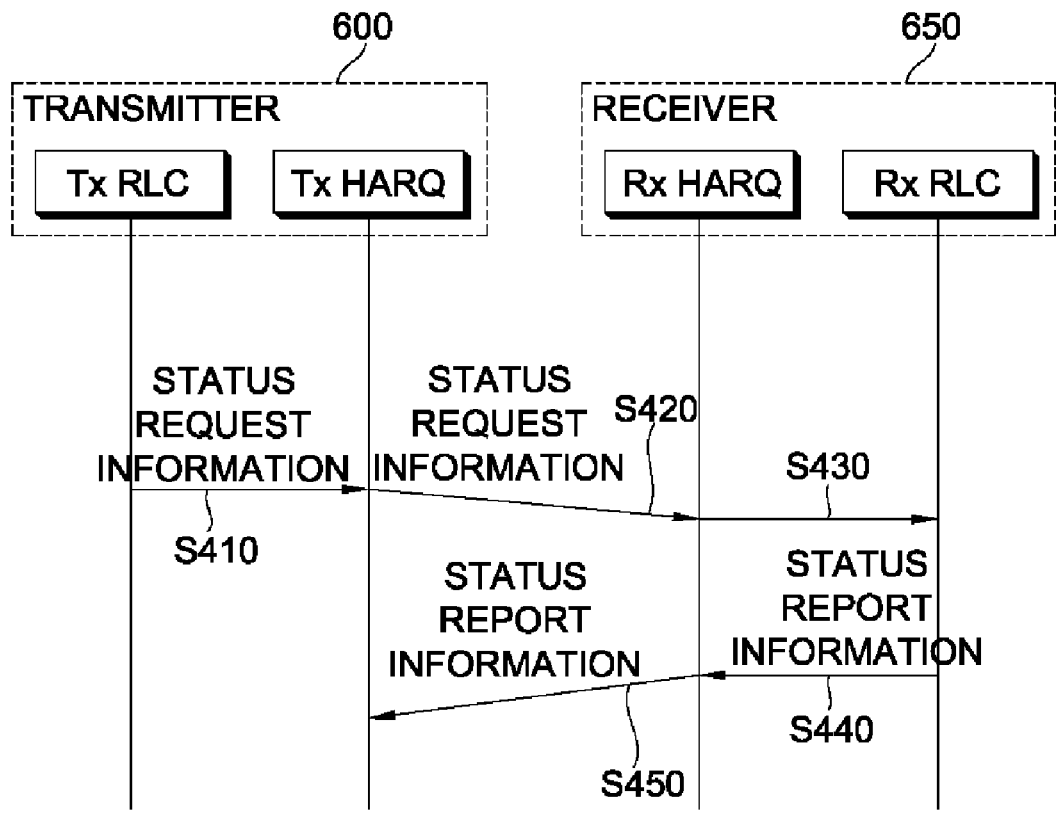
[Fig. 7]

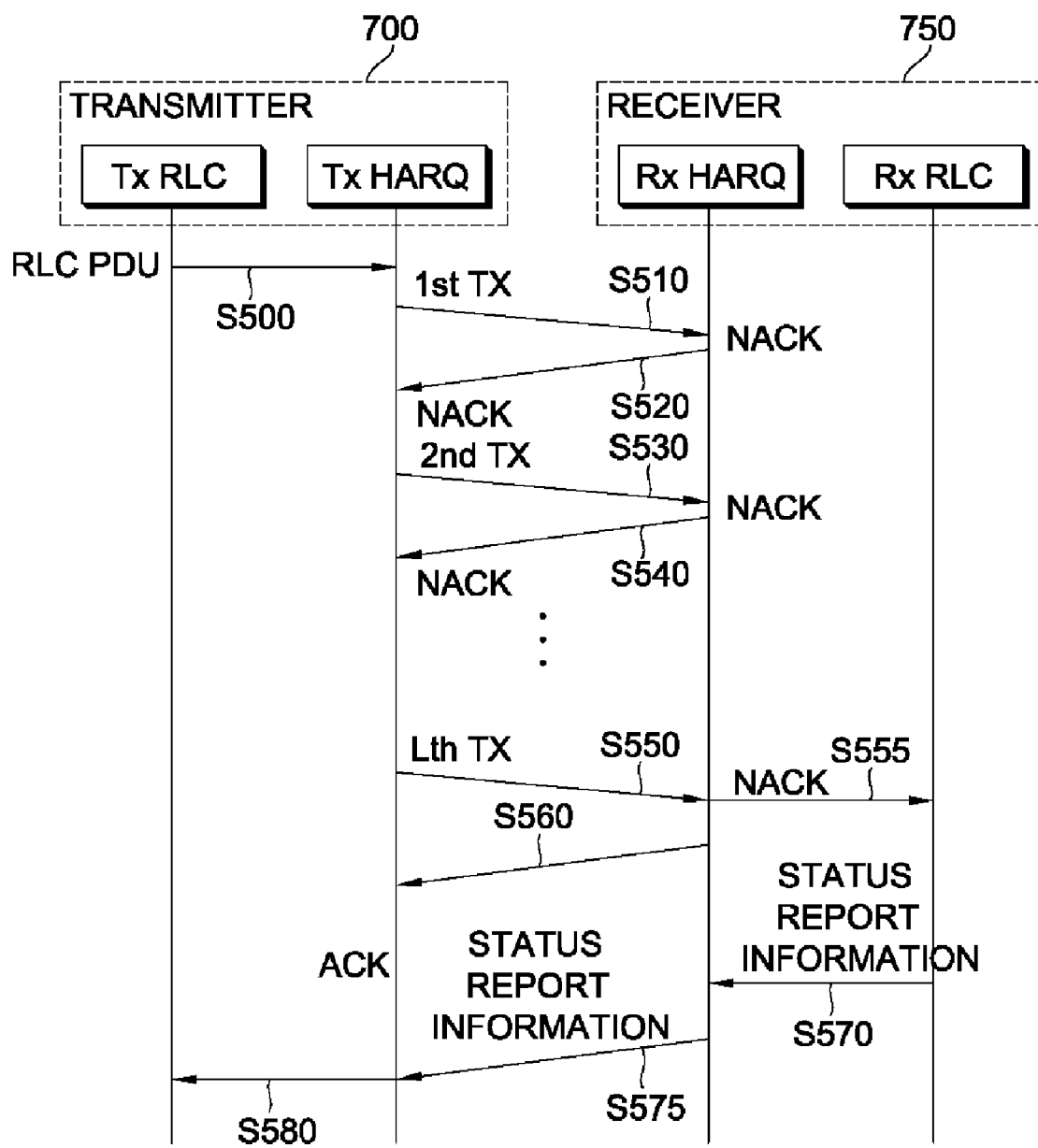

DATA TRANSMISSION METHOD AND DATA RETRANSMISSION METHOD

This application is a continuation of U.S. application Ser. No. 12/158,646, filed on Jun. 20, 2008, which is a national stage application of PCT/KR2007/000022, filed on Jan. 3, 2007, which claims the benefit and right of priority to U.S. Provisional Application No. 60/757,063, filed on Jan. 5, 2006, U.S. Provisional Application No. 60/784,976, filed on Mar. 22, 2006, U.S. Provisional Application No. 60/797,402, filed on May 2, 2006, U.S. Provisional Application No. 60/815,722, filed on Jun. 21, 2006 and Korean Application No. 10-2006-0132469, filed on Dec. 22, 2006, the contents of which are hereby incorporated by reference herein in their entirety.

TECHNICAL FIELD

The present invention relates to wireless communication, and more particularly, to a data transmission method and a data retransmission method which can reduce loss in data transmission.

BACKGROUND ART

A 3GPP (3-rd Generation Partnership Project) mobile communication system based on a WCDMA (Wideband Code Division Multiple Access) radio access technology has been widely spread all over the world. An HSDPA (High Speed Downlink Packet Access) which can be defined as a first evolution step of the WCDMA provides a radio access technology having a high competitive power in a mid-term future for the 3GPP. However, since requirements and expectations of users and providers have increased more and more and competitive development of the radio access technology has been made more and more, a new technological evolution of the 3GPP is required to enhance a high competitive power in the future.

The 3GPP entered into a project called "Evolved UTRA and UTRAN" from the end of 2004 for the purpose of development of a radio transmission technology which can provide a high-quality service and reduce cost. The project of 3G long term evolution (hereinafter, referred to as LTE) aims at expansion of a coverage, improvement of system capacity, decrease in cost of users and providers and improvement in service quality. The 3G LTE defines as high-level requirements decrease in cost per bit, enhancement in service availability, flexible utilization of frequency bands, open interface with a simple structure and appropriate power consumption of by user equipments.

In any communication system, data can be lost in a physical channel. With the development of technologies, the probability that data are not transmitted well from a transmitter to a receiver in the physical channel is lowered, but does not disappear completely. Particularly, in case of user equipments spaced apart from a base station, the data loss rate is high. Important signaling data or control signals need be subjected to more special management for the purpose of reliability of the communication systems.

One of techniques used to reduce the loss of data is an ARQ (Automatic Repeat Request) method. Generally, the ARQ method is performed by a high-level layer. Lower-level layers perform HARQ (Hybrid ARQ), thereby reducing the loss of data. The HARQ uses a FEC (Forward Error Correction) and the ARQ together to correct an error of data by the use of the FEC and to retransmit the data by the use of the ARQ.

When a receiver fails to receive data at the time of retransmission, the reception failure should be rapidly reported to a transmitter. This is because it is possible to reduce the time for correction of an error and the time for solving an obstacle to data transmission by allowing the transmitter to rapidly recognize the data reception failure. As the transmitter recognizes more rapidly the reception failure, the time for retransmission is more reduced.

DISCLOSURE OF INVENTION

Technical Problem

There is a need for technologies for enhancing reliability of transmission by efficiently using the ARQ of the high-level layer and the HARQ of the low-level layer.

Technical Solution

An advantage of some aspects of the invention is to provide a data transmission method and a data retransmission method which can retransmit data, which are not received by a receiver, while efficiently using radio resources.

In an aspect of the invention, a data block is prepared in a high-level layer and the data block is transmitted in a low-level layer. Status report information associated with reception or non-reception of the data block is received through the low-level layer.

In another aspect of the invention, a RLC (Radio Link Control) PDU (Protocol Data Unit) is prepared in a RLC layer and the RLC PDU is transmitted using a HARQ (Hybrid Automatic Repeat Request) in a physical layer. Status report information associated with reception or non-reception of the RLC PDU is received. Whether the RLC PDU should be retransmitted is determined on the basis of the status report information.

In still another aspect of the invention, a datat block is retransmitted a data block through an HARQ by a preset number of times in a physical layer. A reception of a NACK (Not ACKnowledgement) signal is reported to a RLC layer when receiving the NACK signal by the maximum allowable number of times. Whether the data block should be retransmitted is determined.

Advantageous Effects

When a receiver does not receive data transmitted from a transmitter, the transmitter can rapidly confirm the reception failure and retransmit the data. By transmitting status report information from the receiver to the transmitter through a physical layer, it is possible to relatively rapidly retransmit data. By providing operations of RLC entities for allowing data to arrive at the receiver without any error, it is possible to more rapidly transmit data and to enhance the QoS (Quality of Service).

BRIEF DESCRIPTION OF THE DRAWINGS

FIG. 1 is a block diagram illustrating a wireless communication system.

FIG. 2 is a block diagram illustrating a control plane of a radio interface protocol.

FIG. 3 is a block diagram illustrating a user plane of the radio interface protocol.

FIG. 4 is a flowchart illustrating a data transmission method according to an exemplary embodiment of the invention.

FIG. 5 is a flowchart illustrating a data transmission method according to another exemplary embodiment of the invention.

FIG. 6 is a flowchart illustrating an example of transmission and reception of status report information.

FIG. 7 is a flowchart illustrating another example of transmission and reception of status report information.

FIG. 8 is a flowchart illustrating a data transmission method according to another exemplary embodiment of the invention.

MODE FOR THE INVENTION

Figure 9:
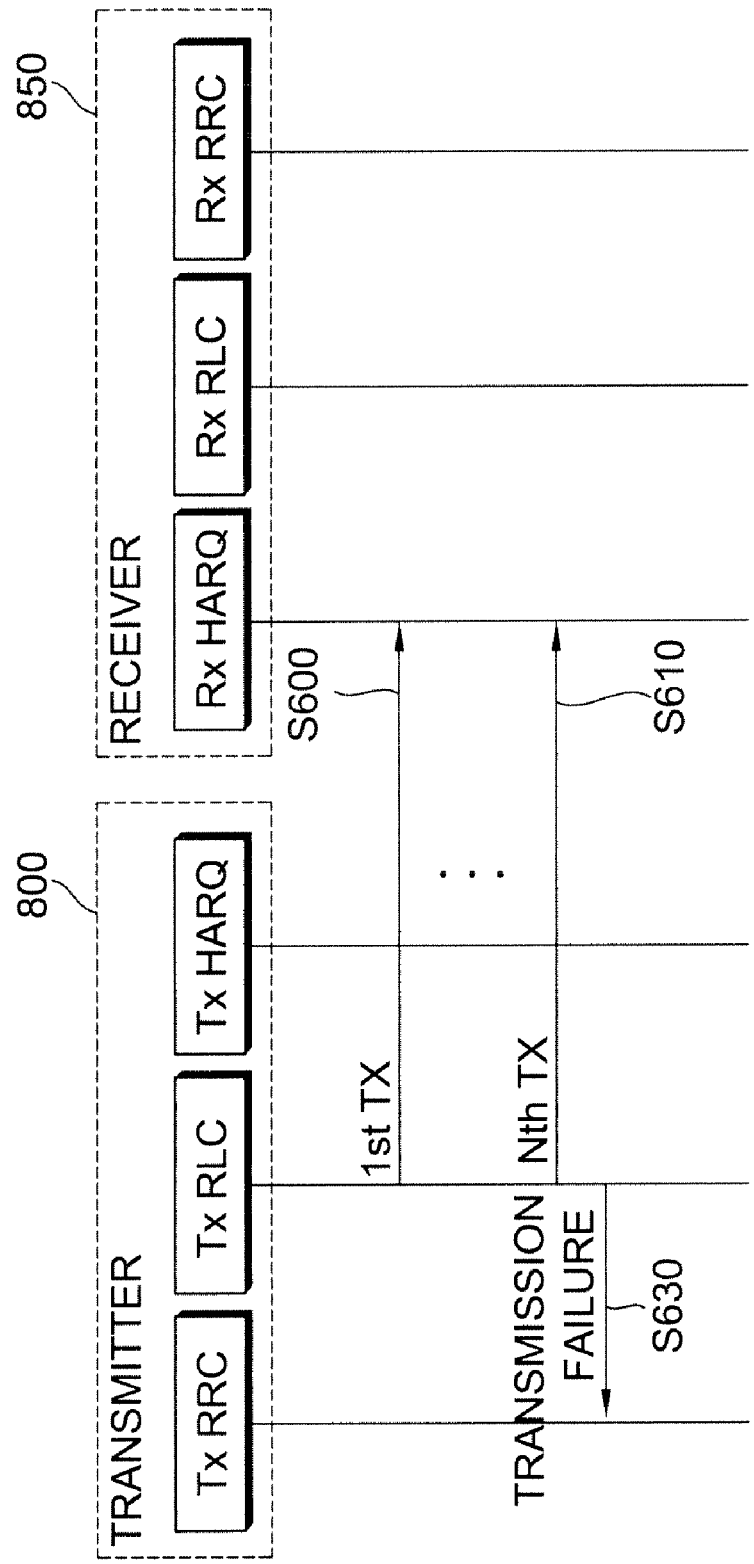
FIG. 9 is a flowchart illustrating a data transmission method according to another exemplary embodiment of the invention.

Hereinafter, exemplary embodiments of the invention will be described in detail with reference to the attached drawings.

FIG. 1 is a block diagram illustrating a wireless communication system. The wireless communication system may have a network structure of an E-UMTS (Evolved-Universal Mobile Telecommunications System). The E-UMTS may be a long term evolution (LTE) system. The wireless communication system is widely disposed to provide a variety of communication services of voices, packet data and the like.

Referring to FIG. 1, the E-UMTS network can be roughly classified into an E-UTRAN (Evolved-UMTS Terrestrial Radio Access Network) and a CN (Core Network). The E-UTRAN includes eNode-B 20 and an AG (access gateway) 30 which is located at the end of the network and connected to an external network.

A UE (User Equipment) 10 may be fixed or movable and can be called various terminologies such as a mobile station (MS), a user terminal (UT), a subscriber station (SS) and a wireless device.

The eNode-B 20 generally means a fixed station communicating with the UE 10 and can be called various terminologies such as a base station (BS), a base transceiver system (BTS) and an access point (AP). One or more cells may exist in one eNode-B 20. An interface for transmitting a user traffic or a control traffic may be used between the eNode-Bs 20.

The AG 30 is also called MME/UPE (Mobility Management Entity/User Plane Entity). The AG 30 may be divided into a portion for processing a user traffic and a portion for processing a control traffic. The AG for processing the user traffic and the AG for processing the control traffic can communicate with each other by the use of a new interface.

The CN may include the AG 30 and a node for registering for other UEs 10. An interface for distinguishing the E-UTRAN and the CN from each other may be used.

Layers of a radio interface protocol between the UE and the network can be classified into an L1 layer (first layer), an L2 layer (second layer), and an L3 layer (third layer) on the basis of three low-level layers of an open system interconnection (OSI) model widely known in the communication systems. A physical layer belonging to the first layer provides an information transfer service using a physical channel and a RRC (Radio Resource Control) layer located in the third layer serves to control radio resources between the UE and the network. The RRC layer interchanges an RRC message between the UE and the network. The RRC layer can be distributed into the eNode-B and network nodes such as the AG or can be located locally in the eNode-B or the AG.

The radio interface protocol horizontally includes a physical layer, a data link layer, and a network layer. The radio interface protocol vertically includes a user plane for transmitting data and information and a control plane for transmitting a control signal.

FIG. 2 is a block diagram illustrating a control plane of the radio interface protocol. FIG. 3 is a block diagram illustrating a user plane of the radio interface protocol. FIGS. 2 and 3 illustrate a structure of the radio interface protocol between the UE and the E-UTRAN based on a 3GPP radio network standard.

Referring to FIGS. 2 and 3, the physical layer as the first layer provides an information transfer service to a high-level layer by the use of a physical channel. The physical layer is connected to a MAC (Medium Access Control) layer as a higher-level layer through a transport channel. Data are transmitted between the MAC layer and the physical layer through the transport channel. Data are transmitted between different physical layers, that is, between a transmission-side physical layer and a reception-side physical layer, through a physical channel.

The MAC layer of the second layer provides a service to a RLC (Radio Link Control) layer as a higher-level layer through a logical channel. The RLC layer of the second layer supports the data transmission with reliability. The function of the RLC layer may be embodied by a functional block in the MAC layer and in this case, the RLC layer may not exist.

A PDCP (Packet Data Convergence Protocol) layer of the second layer performs a head compression function of reducing a head size of an IP packet containing unnecessary control information with a relatively large size in order to efficiently transmit packets in a radio interval having a small bandwidth at the time of transmitting an IP (Internet Protocol) packet such as IPv4 or IPv6.

The RRC layer located at the lowermost of the third layer is defined in only the control plane. The RRC layer controls the logical channel, the transport channel, and the physical channel associated with the configuration, re-configuration and release of the radio bearers (RB). The RB means a service provided from the second layer so as to transmit data between the UE and the E-UTRAN.

A downlink transport channel for transmitting data from the network to the UE can include a broadcast channel (BCH) for transmitting system information and a downlink shared channel (SCH) for transmitting a user traffic or a control message. The traffic or the control message of the downlink multicast or the broadcast service may be transmitted through the downlink SCH or through a particular downlink MCH (Multicast Channel). An uplink transport channel for transmitting data from the UE to the network can include a random access channel (RACH) for transmitting an initial control message and an uplink SCH (Shared Channel) for transmitting a user traffic or a control message.

The RLC layer has basic functions of guarantee of QoS (Quality of Service) of the RBs and transmission of data. Since the RB service is a service which is provided to a higher-level layer from the second layer in the radio protocol, the entire second layer affects the QoS and the affection of the RLC layer is the largest. The RLC layer has independent RLC entity for each RB so as to guarantee the QoS specific to the RB and three RLC modes of a unacknowledged mode (UM), an acknowledged mode (AM) and a transparent mode (TM) so as to support a variety of QoS. Two modes, that is, the UM not including an acknowledgement to transmitted data and the AM including the acknowledgement, will be described below.

The UM RLC layer adds a PDU (Protocol Data Unit) header having a sequence number to each PDU and thus informs a receiver of a lost PDU. For this reason, in the user plane, the UM RLC layer takes charge of transmission of broadcast/multicast data or transmission of real-time packet data such as voices (for example, VoIP) or streaming of a packet service domain. In the control plane, the UM RLC layer takes charge of transmission of an RRC message not requiring the acknowledgement among the RRC messages transmitted to a specific UE or a specific UE group in a cell.

Similarly to the UM RLC layer, the AM RLC layer adds a PDU header having a sequence number at the time of constituting a PDU, but a receiver transmits the acknowledgement to the PDU transmitted from a transmitter unlike the UM RLC layer. This is designed to allow the receiver to request the transmitter for retransmission of the PDU which is not received by the receiver. The AM RLC layer guarantees error-free data transmission through retransmission and thus the AM RLC takes charge of transmission of non-real-time packet data such as TCP/IP of the packet service domain mainly in the user plane and can take charge of transmission of RRC message requiring the acknowledgement.

In view of directionality, the UM RLC layer is used in a uni-directional communication but the AM RLC is used in a bi-directional communication due to a feedback from the receiver. Since the bi-directional communication is mainly used for a point-to-point communication, the AM RLC layer uses only a specific logical channel. In view of a structure, one RLC entity of the UM RLC layer has only one of transmission and reception, but one RLC entity of the AM RLC layer includes both of transmission and reception.

The complexity of the AM RLC results from the ARQ function. The AM RLC layer has a retransmission buffer in addition to a transmission/reception buffer so as to manage the ARQ, and performs a variety of functions of utilization of a transmission/reception window for a flow control, polling of allowing a transmitter to request a receiver of a peer RLC entity of status information, status report of allowing the receiver to report its buffer status to the transmitter of the peer RLC entity and piggyback of inserting the status PDU into the data PDU so as to enhance the efficiency of data transmission. In addition, the functions of the AM RLC layer include a reset PUD requesting the opposite AM RLC entity to reset all the operations and parameters when the AM RLC entity finds out an fatal error in the course of operation and a reset ACK PDU used in acknowledgement of the reset PDU. In order to support the functions, the AM RLC requires a variety of protocol parameters, status variables and timers. The PDUs used for report of the status information or control of the data transmission by the AM RLC layer, such as the status PDU and the reset PDU are called control PDUs. The PDUs used for transmission of user data are called data PDUs.

Radio resources in one cell include uplink radio resources and downlink radio resources. The eNode-B takes charge of assignment and control of the uplink radio resources and the downlink radio resources. The eNode-B determines when a UE uses a radio resource, what a UE uses a radio resource and what radio resource a UE uses.

For example, the eNode-B may determine that frequencies of 100 MHz to 101 MHz are assigned to the UE for 0.2 seconds in 3.2 seconds for the downlink data transmission. Then, the base station informs the corresponding UE of the determination details so as to allow the corresponding UE to receive the downlink data. Similarly, the eNode-B determines when a UE uses a radio resource, what a UE uses a radio resource and what radio resource a UE uses so as to transmit uplink data. The eNode-B transmits such information to the corresponding UE. In this way, the eNode-B can dynamically manage the radio resources.

A conventional UE continuously used one radio resource during a call connection. This is irrational in consideration of the fact that many recent services are based on IP packets. Most packet services do not continuously create packets during the call connection, but there are many intervals where no data is transmitted. It is not efficient that a radio resource is continuously assigned to a UE. A method of assigning a radio resource to a UE only when service data exist can be used to solve the above-mentioned problem.

The RLC entity constitutes a RLC PDU in accordance with the size of the radio resource determined by the MAC. The RLC entity located in the eNode-B constructs data with the size determined by the MAC entity and sends the RLC PDU to the MAC entity. The RLC entity located in the UE constructs the RLC PDU in accordance with the size of a radio resource determined by a lower-level layer, that is, the MAC entity. The RLC entity located in the UE constructs data with the size determined by the MAC entity and sends the RLC PDU to the MAC entity.

The MAC entity located in the UE receives information on the total amount of radio resources from the eNode-B. The MAC entity receives information indicating what amount of radio resources the MAC entity can use at the next transmission time from the eNode-B. On the contrary, the MAC entity located in the eNode-B determines utilization of all of the uplink radio resources and the downlink radio resources. The MAC entity of the eNode-B determines what amount of radio resources should be assigned to the UE at the next transmission interval and sends the determination result to the MAC entities of the UEs. The UEs determine what amount of data should be transmitted through the logical channels or by the RLC entities in consideration of data stored in their buffers and priorities thereof. Each RLC entity determines the size of the RLC PDU to be transmitted to the MAC entity. Similarly, the MAC entity located in the eNode-B determines what amount of data should be assigned to the respective RLC entities in consideration of the amount of downlink data of the respective UEs and the priorities of the data and sends the determination result to the respective RLC entities. The respective RLC entities construct a RLC PDU in accordance with the determination result and transmit the constructed RLC PDU to the MAC entity.

The PDU is a basic data unit used for data communication between layers. The PDU is a data which is transmitted from a corresponding layer to a different layer. A RLC PDU, a MAC PDU and the like are examples of the data used by the layers. An SDU (Service Data Unit) is a data unit from a different layer to the corresponding layer.

FIG. 4 is a flowchart illustrating a data transmission method according to an exemplary embodiment of the invention. Tx RLC denotes a RLC entity in a transmitter 30 and Tx HARQ denotes a lower-level layer of the RLC layer for performing the HARQ in the transmitter 300. Rx RLC denotes a RLC entity in a receiver 350 and Rx HARQ denotes a lower-level layer of the RLC layer for performing the HARQ in the receiver 350. The HARQ is mainly performed in the physical layers. The HARQ operation may be performed using the MAC PDU and the ARQ operation is at a level higher than the HARQ operation.

Referring to FIG. 4, the RLC PDU is transmitted to the Tx HARQ from the Tx RLC (S100). The RLC PDU is transmitted to the MAC layer and can be converted into one or more MAC PDUs containing header information. The MAC PDU serves as a data block to be transmitted from the physical layer through the HARQ. The Tx HARQ transmits a data block to the Rx HARQ (S110). When no error is detected from the received data block, the Rx HARQ transmits an ACK (Acknowledgement) signal to the Tx HARQ and sends the data block to the Rx RLC as a higher-level layer. For clarity, it is assumed that an error is detected from the data block received by the Rx HARQ.

When an error is detected from the data block, the Rx HARQ transmits an NACK (Not Acknowledgement) signal to the Tx HARQ (S120). The NACK signal serves as a retransmission request signal in the HARQ. The Tx HARQ transmits a retransmission data block to the Rx HARQ (S130). The retransmission data block may be equal to or different from the data block before the retransmission, depending on the HARQ method. When no error is detected in the second transmission, the Rx HARQ transmits the ACK signal to the Tx HARQ and sends the data block to the Rx RLC as a higher-level layer. Here, it is assumed that an error is detected in the second transmission and the Rx HARQ transmits the NACK signal to the Tx HARQ (S140).

In this way, the transmission may be repeated L times (S150). L denotes the maximum allowable number of iteration. When an error is detected in the L-th transmission, the Rx HARQ transmits the NACK signal to the Tx HARQ (S160).

When receiving the N-th NACK signal, the Tx HARQ reports transmission failure to the Tx RLC (S170). The Tx RLC to which the transmission failure is reported sends the RLC PDU to the Tx HARQ again and starts the retransmission (S180).

The Tx RLC sends the RLC PUD to the Tx HARQ (S180). The Tx HARQ retransmits the data block to the Rx HARQ (S190).

When the transmitter 300 transmits a MAC PDU by the allowable number of iteration and receives the NACK signal from the receiver 350 as many, the information is reported directly to the Tx RLC, not through the Rx RLC. Since the information does not pass through the RLC entity of the receiver 350, it is possible to check the necessity of retransmission more quickly. When the transmitter 300 starts directly new HARQ transmission in response to the NACK signal transmitted from the receiver 350, the receiver 350 can more rapidly recognize a reception error.

On the other hand, the transmitter 300 retransmits a specific RLC PDU several times (N times) but may receive a response indicating that the specific RLC PDU is not received by the receiver 350. When the RLC PDU is transmitted N times, the transmission is not performed any more and other data is transmitted. When the Tx RLC has transmitted the RLC PDU N times and received a negative response in response thereto, the Tx RLC can inform to the receiver 350 that the data is not transmitted any more, without retransmitting the data. If the receiver 350 does not know that the transmission of data has been abandoned, the request for retransmitting the data may be transmitted to the transmitter 300.

When a certain condition occurs and the transmitter 300 does not transmit a specific data block any more, the transmitter 300 may inform the receiver 350 of the fact. At this time, the transmitter 300 can inform the receiver 350 of the fact by the use of a header of a data block or a control data block. The data block may be a RLC PDU or a MAC PDU.

The Rx LRC stops the waiting for the data block when receiving information indicating that a data block is not transmitted from the transmitter 300. At this time, the receiver 350 can operate as if it received the data block. Alternatively, the receiver 350 may operate as if the data block was deleted. The receiver 350 may advance an window or reconstruct data regardless of the existence of the data block.

FIG. 5 is a flowchart illustrating a data transmission method according to another exemplary embodiment of the invention.

Referring to FIG. 5, the RLC PDU is sent from the Tx RLC to the Tx HARQ (S200). The Tx HARQ transmits a data block to the Rx HARQ (S210). When an error is detected from the data block, the Rx HARQ transmits a NACK signal to the Tx HARQ (S220). The Tx HARQ transmits a retransmission data block to the Rx HARQ (S230). An error is detected in the second transmission and the Rx HARQ transmits the NACK signal to the Tx HARQ (S240). In this way, the transmission of the data block can be repeated the maximum allowable number of times L (S250).

An error is not detected in the final transmission and the data block is sent to the Rx RLC (S255). The Rx HARQ transmits the ACK signal to the Tx HARQ (S260). In step S260, the Tx HARQ may recognize the ACK signal as the NACK signal due to an influence of a physical channel. If the Tx RLC to which the failure is reported retransmits the RLC PDU, it may waste the radio resources.

In order to prevent the waste of radio resources, the Rx RLC constructs status report information and sends the status report information to the Rx HARQ (S270).

The Rx HARQ sends the status report information to the Tx HARQ (S275). The status report information is information which is transmitted from the receiver 450 to the transmitter 400 and includes information on a data block received by the receiver 450 and a data block not received by the receiver 450. The status report information may be constructed by the RLC layer or by the MAC layer. The receiver 450 can allow only the information on the data block not received by the receiver 450 to be included in the status report information. Since the data loss in the physical layer is very small by using the HARQ, it may not be efficient that the receiver 450 transmits all the information on the data block received by the receiver 450 and the data block not received by the receiver 450. Additionally, when the receiver 450 should also transmit information on the data block successfully received by the receiver 450 in response to a request from the transmitter 400, the receiver 450 can transmit the data block having the largest sequence number among the data blocks sequentially received.

The status report information is reported to the Tx RLC (S280). The Tx RLC checks the status report information and then transmits the corresponding RLC PDU. It is important to the ARQ method that when the receiver 450 does not receive the data transmitted from the transmitter 400, the transmitter 400 accurately and rapidly recognizes the failure. The Tx RLC can accurately and rapidly recognize whether the data should be retransmitted, from the status report information transmitted through the physical layer.

The transmitter 400 should transmit an appropriate data block after receiving the status report information from the receiver 450. The Tx RLC does not transmits the RLC SDU sent from the higher-level entity as it is, but reconstructs the RLC PDU with the size required by the lower-level entity and sends the reconstructed RLC PDU to the lower-level entity. For example, the RLC SDU with the size of 1000 bytes can be divided into several RLC PDUs. The receiver 450 may not receive a part of the RLC PDUs of the RLC SDU. For example, the receiver 450 may not receive 100 bytes among 1000 bytes. In this case, it causes the waste of radio resources that the transmitter 400 retransmits the entire RLC SDU. The receiver 450 sends information on the RLC PDUs not received by the receiver 450 to the transmitter 400 and the transmitter 400 then transmits the corresponding RLC PDUs. When the radio resources are not sufficient, the transmitter 400 can transmit RLC sub-PDU into which the RLC PDU is divided.

The status report information is transmitted and received using the physical layer so as to allow the transmitter 400 and the receiver 450 to rapidly exchange the ARQ information. The status report information can be transmitted using a channel defined by the physical layer, not by the level of the RLC PDU or the MAC PDU. When receiving the status report information, the physical layer sends the received status report information to a higher-level RLC entity. When it is necessary to transmit status report information, the RLC entity sends the status report information directly to the physical layer and the physical layer can send the status report information using a physical channel other than the channel through which data are transmitted.

The status report information can be transmitted through a channel through which scheduling information indicating the assignment of physical resources in the physical layer is transmitted. The status report information may be information on a data block received or not received by the RLC entity of the receiver. Alternatively, the status report information may be information on a data block not to be transmitted by the RLC entity of the transmitter or information on a data block abandoned by the transmitter. When it is informed that a specific data block is not transmitted from the transmitter any more, the RLC of the receiver 450 can stop the waiting of the RLC PDU and process the data blocks stored in its buffer.

The receiver 450 can add the status report information to a head portion of a data block. The data block may be a RLC PDU or a MAC PDU. The status report information may be information on the data blocks not received by the receiver 450. The receiver 450 may not allow the status report information to include information on the data blocks received by the receiver.

When the RLC entity or the logical channel is particularly mapped with the HARQ process in order to reduce the overhead of the data blocks in the high-level layers, several fields can be omitted. For example, when RB 1 is mapped with HARQ process 1 in one to one, a TSN or a logical channel identifier can be omitted from the data block transmitted to HARQ 1.

The receiver uses the physical layer to more rapidly and effectively send the status report information. When a data block not received by the receiver exists in the time interval received by the receiver, the receiver may inform the transmitter of the fact by using a signaling through the physical channel. For example, when the receiver transmits signals to the receiver through a physical control channel every time interval, the receiver can inform the transmitter whether the receiver receives the data transmitted from the transmitter in the previous time interval through the physical channel. When the receiver informs the transmitter that the receiver does not receive the data block in the previous time interval through the physical channel, the transmitter can perform the retransmission of the data block. At this time, the information transmitted from the receiver to the transmitter indicates in what time interval the receiver fails to receive the data block. When the receiver fails to receive the data block transmitted from the transmitter, the receiver may inform the transmitter of the information on the time interval when the reception failure occurs.

In an exemplary embodiment, the information on the time interval transmitted from the receiver to the transmitter can include information on the reception success and failure of the receiver for all the transmission from the transmitter in the time interval, which is set in a constant size by the receiver, or occurrence time information thereof.

In another exemplary embodiment, the information on the time interval transmitted from the receiver to the transmitter can include information on the reception failure of the receiver for all the transmission from the transmitter in the time interval, which is set in a constant size by the receiver, or occurrence time information thereof. In still another exemplary embodiment, the information on the time interval transmitted from the receiver to the transmitter can include information on the reception success and failure of the receiver for the transmission from the transmitter or occurrence time information thereof. In still another exemplary embodiment, the information on the time interval transmitted from the receiver to the transmitter can include information on the reception failure of the receiver for the transmission from the transmitter or occurrence time information thereof.

When the transmitter receives the information on the reception failure or the time information thereof, the transmitter can make an appointment of retransmission of the corresponding data regardless of the reception of the status report information from the receiver. The transmission of the information on the reception failure or the time information thereof can be performed by a physical layer or a MAC entity. A physical layer or a MAC layer of the transmitter having received the information on the reception failure or the time information thereof transmitted from the receiver may inform the RLC layer of the information. The RLC entity of the transmitter having received the information on the reception failure or the time information thereof transmitted from the receiver may retransmit the corresponding RLC PDU or RLC SDU and reconstruct the RLC PDU as needed.

FIG. 6 is a flowchart illustrating an example of transmission and reception of the status report information. The status report information can be transmitted to the transmitter in a state where it is arbitrarily or previously set by the receiver. Alternatively, in order to more rapidly check the status report information, the transmitter may request for the transmission of the status report information through status request information.

Referring to FIG. 6, the Tx HARQ transmits status request information to the Rx HARQ (S310). The status request information request the receiver for transmitting the status report information. The status request information allows the transmitter 500 and the receiver 550 to more rapidly exchange the status report information. The status request information is information indicating that the receiver 550 should rapidly construct and transmit the status report information. When receiving the status request information, the Rx HARQ informs the Rx RLC of the fact (S320). The Rx RLC constructs and sends the status report information to the Rx HARQ (S330). The Rx HARQ transmits the status report information (S340).

When a predetermined condition is satisfied, the physical layer of the transmitter 500 can transmit the status request information through a physical channel different from the physical channel through which data are transmitted. For example, when the physical layer performs the retransmission the same number of times as the maximum number of times of HARQ retransmission set in the data block transmitted by the physical layer, the physical layer can set and transmits the status request information.

The status report information or the status request information can be transmitted through a control information transport channel which is used in the physical layer to transmit the scheduling information.

FIG. 7 is a flowchart illustrating another example of transmission and reception of the status report information.

Referring to FIG. 7, the Tx RLC requests for the status request information (S410). The status request information may be requested by a higher-level layer as well as the physical layer. When the buffer of the RLC entity is empty, for example, when the final RLC PDU has been transmitted, the RLC entity can request for the status request information so as to receive the status report information from the receiver 650. The Tx HARQ transmits the status request information to the Rx HARQ (S420). When receiving the status request information, the Rx HARQ informs the Rx RLC of the fact (S430). The Rx RLC constructs and sends the status report information to the Rx HARQ (S440). The Rx HARQ transmits the status report information (S450).

FIG. 8 is a flowchart illustrating a data transmission method according to another exemplary embodiment of the invention.

Referring to FIG. 8, the RLC PDU is sent from the Tx RLC to the Tx HARQ (S500). The Tx HARQ transmits a data block to the Rx HARQ (S510). When an error is detected from the data block, the Rx HARQ transmits an NACK signal to the Tx HARQ (S520). The Tx HARQ transmits the retransmission data block to the Rx HARQ (S530). An error is detected in the second transmission and the Rx HARQ transmits the NACK signal to the Tx HARQ (S540). In this way, the transmission can be repeated by L times which is the maximum allowable number of times (S550).

When an error is detected in the final transmission, the Rx RLC is requested for constructing the status report information (S555). The Rx RLC constructs and sends the status report information to the Rx HARQ (S570). When an error is detected and the Rx HARQ transmits the NACK signal, the Tx HARQ may recognize the NACK signal as the ACK signal (S560). The Rx HARQ transmits the status report information to the Tx HARQ (S575). The status report information is reported to the Tx RLC (S580). Accordingly, even when an error occurs from the ACK/NACK signal, the RLC can accurately judge whether the retransmission should be performed on the basis of the status report information.

Independently of the status report information, the physical layer can transmit particular information to more effectively transmit the ACK/NACK signals between the HARQ. When the transmitter performs the final HARQ process of a specific data block, the transmitter can transmit particular information indicating that the final HARQ of the specific data block is being transmitted, through the physical layer.

FIG. 9 is a flowchart illustrating a data transmission method according to another exemplary embodiment of the invention. It relates to a method of allowing the RLC entity to cope with an emergency.

Referring to FIG. 9, the Tx RLC transmits a RLC PDU to the receiver 850 (S600). When the first transmission fails, the Tx RLC performs the retransmission. The retransmission can be repeated by N times which is the maximum allowable number of times (S610). When the N-th transmission fails, the Tx RLC informs the Rx RRC of the failure (S630).

When the case where the transmitter 800 transmits a specific data block but does not receive an acknowledgement from the receiver 850 is repeated a predetermined number of times or more, the RLC layer may inform a higher-level layer of resetting a communication condition. When the RRC is informed by the RLC that it transmits a data block a predetermined number of times or more but does not receive an acknowledgement from the opposite party, the RRC solve this problem by using the RRC signaling of the higher-level layer. The RRC signaling means that the transmitter and the receiver transmit an RRC message to each other. In this case, the RRC can reset the RLC.

When transmitting the specific data block several times but not receiving an acknowledgement from the receiver 850, the Tx RLC may stop the transmission of the data block. Tx RLC may inform the Tx RRC as a higher-level layer of this fact, and waits for an instruction therefrom. Alternatively, when recognizing an abnormal operation in the transmission of the specific data block, the Tx RLC may not process such a situation, but inform the RRC as a higher-level layer of the situation and comply with an instruction therefrom.

Figure 10:
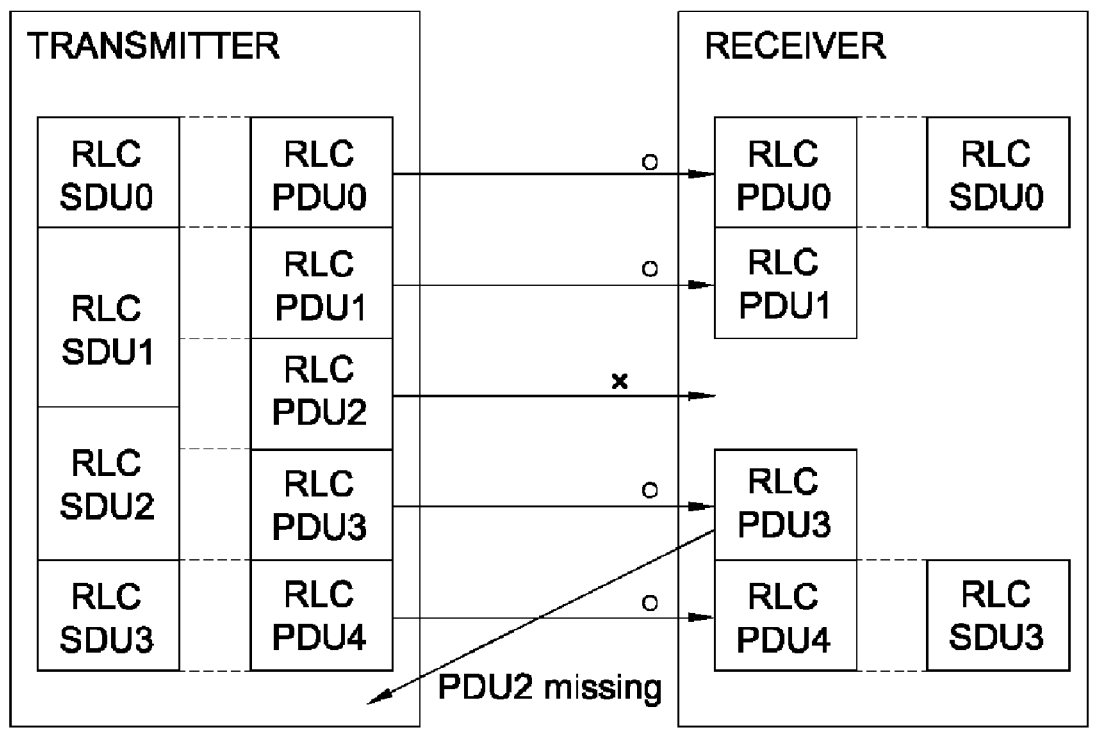
FIG. 10 is a block diagram illustrating a data transmission method according to another exemplary embodiment of the invention.

FIG. 10 is a block diagram illustrating a data transmission method according to another exemplary embodiment of the invention.

Referring to FIG. 10, the transmitter sequentially transmits RLC PDU0, RLC PDU1, RLC PDU2, RLC PDU3, and RLC PDU4 and the receiver receives successfully RLC PDU0 and RLC PDU1 but fails to receive RLC PDU2. Since failing to receive RLC PDU2, the receiver loads the information on RLC PDU2 to the status report information.

RLC PDU2 includes a part of RLC SDU1 and a part of RLC SDU2. When the receiver transmits the status report information based on the information of the SDU, the receiver should transmit at least two information pieces, that is, information pieces on RLC SDU0 and RLC SDU1. On the contrary, when the receiver transmits the status report information based on the information of the PDU, the receiver can transmit only one information piece, that is, the information on the RLC PDU2. Accordingly, by transmitting the status report information based on the information of the PDU, it is possible to reduce the amount of data to be transmitted.

The PDU can be expressed in various ways. For example, the PDU can be expressed as what portion of the SDU is addressed by the data included in the PDU or as sequence number assigned to each PDU. In order to allow the transmitter and the receiver to easily manage the PDUs, the status report information can be managed based on the sequence numbers.

Figure 11:
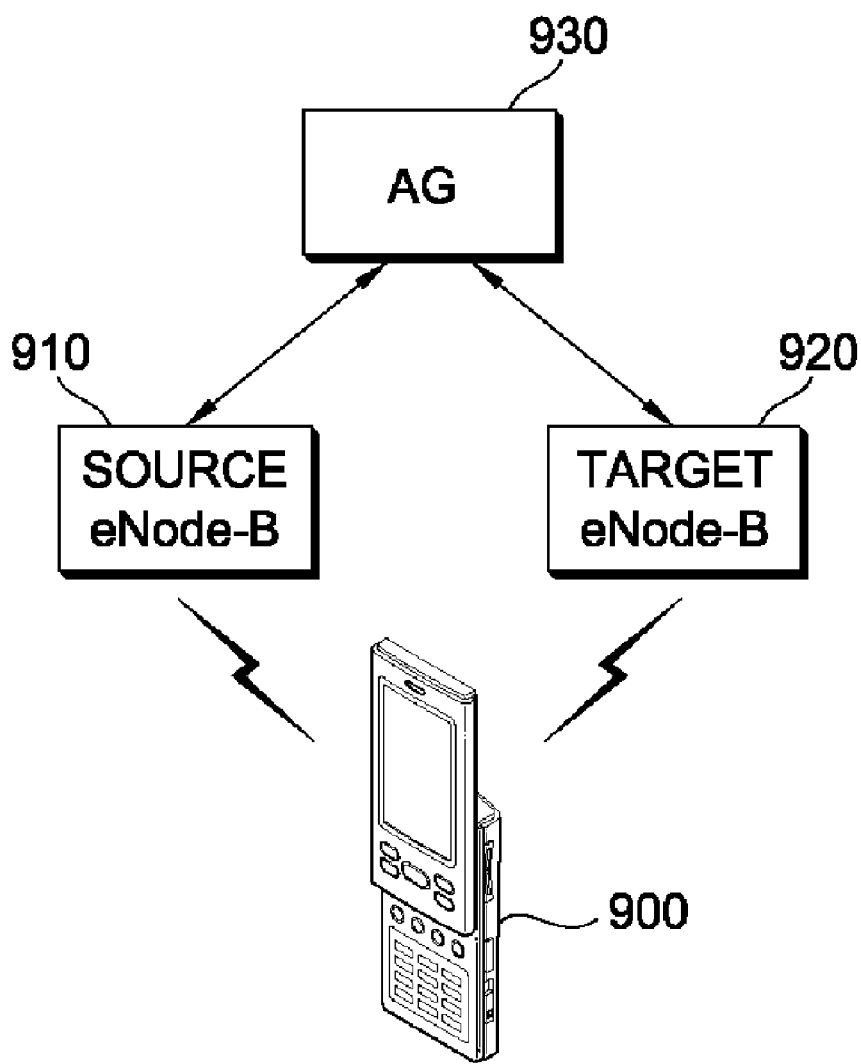
FIG. 11 is a block diagram illustrating a handover according to an exemplary embodiment of the invention.

FIG. 11 is a block diagram illustrating a handover.

Referring to FIG. 11, a source eNode-B 910 denotes an current eNode-B and a target eNode-B 920 denotes a new base station after the handover. When the source eNode-B 910 and the target eNode-B 920 have different information associated with the status report information of a UE 900 or the target eNode-B 920 does not have the latest status report information, unnecessary transmission may cause. The transmission of new data may be delayed due to the unnecessary transmission, thereby deteriorating the QoS. When a handover occurs, the UE 900 retransmits the SDUs, for which no acknowledgement is received from the source eNode-B to the target eNode-B 920.

The UE 900 can reconstruct the RLC SDU into the RLC PDU and transmit the reconstructed RLC PDU to the target eNode-B 920. Alternatively, the source eNode-B 910 can transmit the latest status report information to the target eNode-B 920 and the target eNode-B 920 can transmit the latest status report information to the UE 900.

The SDU which is transmitted from the eNode-B to the AG in the course of the handover can be classified into two kinds, that is, SDU which the source eNode-B 910 transmits to the AG 930 and SDU which the target eNode-B 920 transmits to the AG 930. When the handover does not occur, the eNode-B rearranges the SDU received from the UE, but when the handover occurs, both eNode-Bs transmit the SDU to the AG 930 and thus any eNode-B cannot rearrange the SDU. The AG 930 should check all the SDUs transmitted from the source eNode-B 910 and the target eNode-B 920 and rearrange the SDUs. Right after the handover, the target eNode-B 920 transmits the SDU to the AG 930 every when restoring the SDUs, for a predetermined time, that is, until the handover is completed.

The target eNode-B 920 can transmit to the AG 930 the RLC SDUs received successfully itself by the use of the time information of the handover. The time information of the handover can be received from the source eNode-B 910.

The target eNode-B 920 can transmit the RLC SDU successfully received from the UE 900 to the AG 930 at once for a predetermined time after the handover is made.

The time information can be used to determine how long the target eNode-B 920 transmits the RLC SDU successfully received to the AG 930. The time information may be valid from the time point when the instruction for the handover is received from the source eNode-B 910. Alternatively, the time information may be valid from the time point when the target eNode-B 920 receives a message associated with the handover from the UE 900.

For a predetermined time from the time point when the UE 900 accesses the target eNode-B 920, the target eNode-B 920 may not rearrange but transmit the RLC SDU successfully received from the UE 900 to the AG 930 at once. The target eNode-B 920 may receive the time information from the source eNode-B 910 and not rearrange but transmit the RLC SDU successfully received from the UE 900 to the AG 930 at once until the time point instructed by the time information. After the predetermined time, the target eNode-B 920 may rearrange and transmit the successfully received RLC SDU to the AG 930.

When receiving the RLC SDU having a sequence number smaller than the sequence number designated by the source eNode-B 910, the target eNode-B 920 can transmit the received RLC SDU to the AG 930 at once. The UE 900 transmits the sequence number information at the time of accessing the target eNode-B 920 and the target eNode-B 920 can transmit the received RLC SDU to the AG 930 at once when receiving the RLC SDU having a sequence number smaller than the sequence number. The UE 900 can inform the target eNode-B 920 of the largest sequence number of the sequence numbers of the RLC SDUs which have been transmitted to the source eNode-B 910 at the time of first accessing the target eNode-B 920.

On the other hand, the optimization process may be carried out in the downlink direction. In a new cell, the UE 900 transmits a handover completion message to the target eNode-B 920. In the course, the target eNode-B 920 transmits a response message to the handover completion message. The UE 900 informs the target eNode-B 920 of the largest sequence number of the sequence numbers of the SDUs successfully and continuously received by the UE 900 for the downlink data successfully received by the UE 900. The target eNode-B 920 can newly transmit only the SDUs having a sequence number larger than the acquired sequence number to the UE 900. It is possible to reduce the burden of the UE 900 which classifies and rearranges the SDUs received from the target eNode-B 920 and the source eNode-B 910.

Hereinafter, operation of the ARQ and the HARQ is described.

The HARQ with an N-channel SAQ (Stop-And-Wait) is advantageous for a higher transmission rate. In the HARQ, while one process performs the transmission and then waits for a response thereto, another process performs the transmission. By reducing idle time in the transmission, it is possible to enhance the transmission rate. However, since the radio conditions are often changed, the qualities of radio intervals to be actually experienced may be different from each other between continuous processes.

Accordingly, the process having started the transmission does not always finish the transmission earlier. Therefore, the receiver should be able to perform the rearrangement and thus includes a buffer for performing the rearrangement.

The ARQ entity, that is, the RLC entity operating in the AM mode, includes a buffer. This is because all the portions of the SDU should be stored in the buffer of the receiver until all the PDUs including a specific portion of the SDU arrive. If a gap occurs in the buffer of the receiver, it means that a specific RLC PDU is not received. If a gap occurs in the buffer of the HARQ, it also means that a specific MAC PDU is not received. Since the RLC PDUs constitute the MAC PDUs, the gap in the RLC buffer and the gap in the HARQ buffer are associated with each other. It is possible to perform the buffer management in comprehensive consideration of two gaps. The rearrangement in the HARQ and the RLC PDUs received by the RLC can be simultaneously considered using only one buffer.

The MAC PDUs are decomposed as soon as being received and then are sent to the RLC entities. In order for the RLC entity to solve the gap generated due to the N-channel SAW in the MAC, the RLC entity should check whether the gap generated in the RLC buffer is due to the reception failure or the inversion of transport order generated due to the N-channel SAW. The buffer of the RLC entity can use a timer. When a gap is generated in the buffer of the RLC entity, the timer is activated at once. When data corresponding to the gap is not received until the timer expires, it is judged that the gap is generated due to the reception failure and the status report information may be transmitted to the transmitter.

Figure 12:
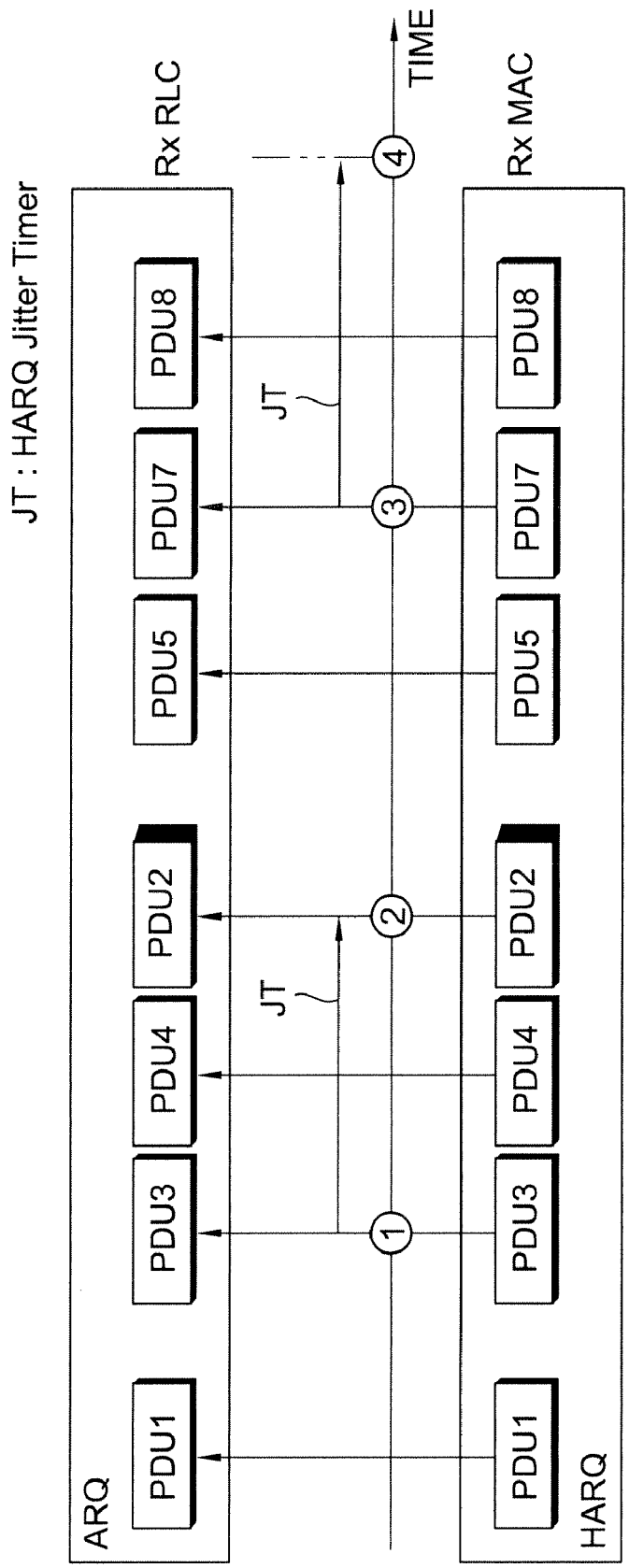
FIG. 12 is a diagram illustrating an example of a data transmission method according to an exemplary embodiment of the invention.

FIG. 12 is a diagram illustrating an example of a data transmission method according to an exemplary embodiment of the invention, where a MAC layer (Rx MAC) and a RLC layer (Rx RLC) in the receiver are shown.

Referring to FIG. 12, in ①, the ARQ entity, that is, the RLC entity, receives PDU3 from the HARQ as a lower-level layer, that is, the MAC layer. Since PDU2 having a sequence number smaller than that of PDU3 does not exist, the receiver checks that the gap is generated due to the inversion of transport order of the HARQ by the use of the HARQ jitter timer JT.

In ②, the RLC entity receives PDU2 before the HARQ jitter timer JT expires, and the HARQ jitter timer JT stops.

In ③, similarly to ①, since the ARQ entity received PDU6 having a sequence number smaller than that of PDU7, the HARQ jitter timer JT is activated.

In ④, although the HARQ jitter timer JT expires, the RLC entity cannot receive PDU6. The receiver judges that the reception of PDU6 fails and transmits the status report information associated therewith to the transmitter.

When receiving the status report information indicating that the receiver does not receive a certain PDU from the receiver, the transmitter retransmits the corresponding PDU. A timer may be set in each data block so as to prevent a deadlock. When the timers set in the SDUs expire, the pieces of the SDUs are not transmitted any more even when the reception failure is reported from the receiver.

When receiving a data block having a sequence number outside the current window, the receiver adjusts the boundary of the window. The operation of the receiver uses the timer and the reception window.

Figure 13:
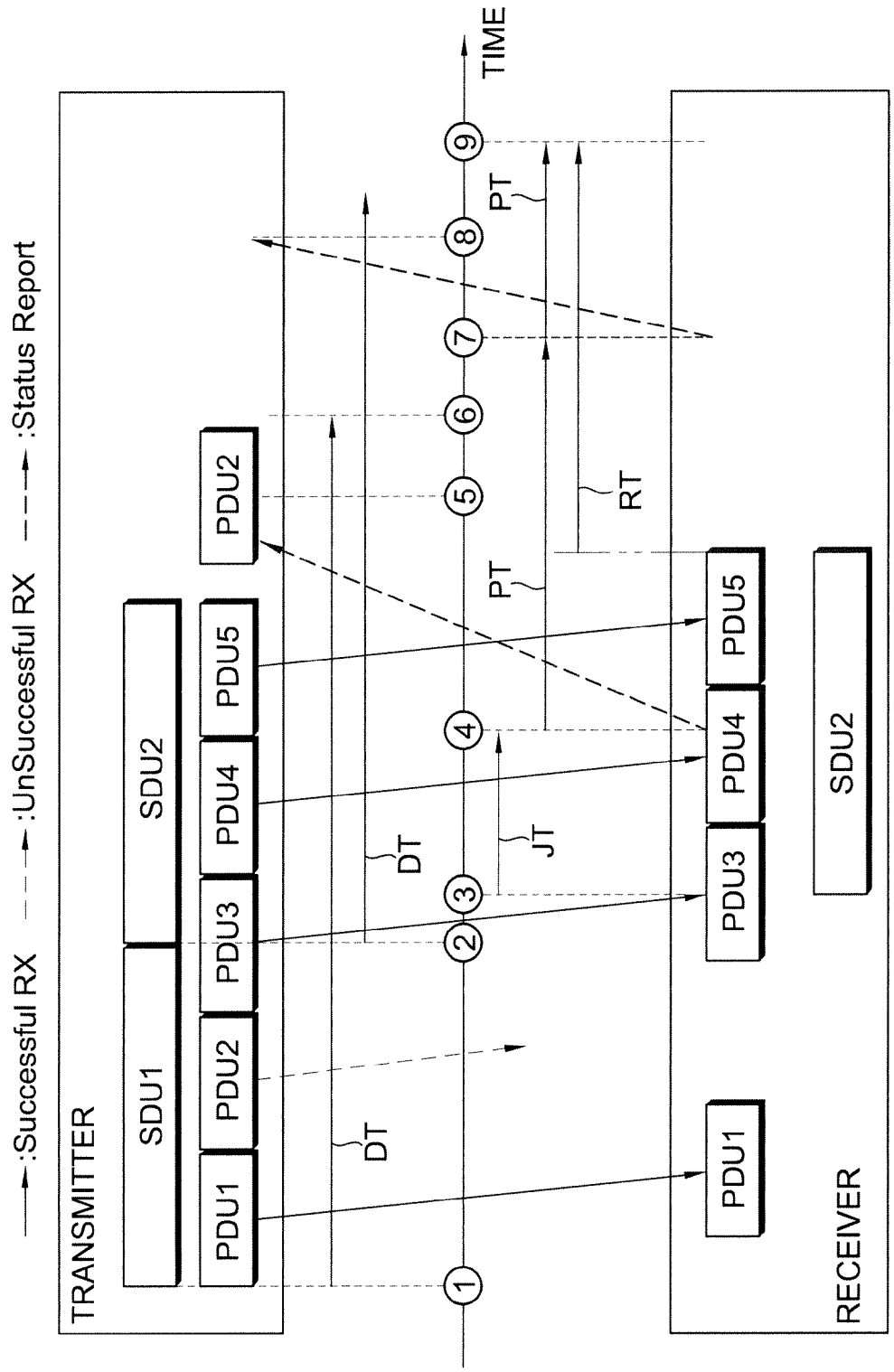
FIG. 13 is a diagram illustrating an example of a data transmission method according to an exemplary embodiment of the invention.

FIG. 13 is a diagram illustrating an example of a data transmission method according to an exemplary embodiment of the invention, where RLCs serving as an AM in the transmitter and the receiver are shown.

Referring to FIG. 13, in ①, SDU1 arrives at the buffer of the transmitter and a discard timer DT is activated. In ②, SDU2 arrives at the buffer of the transmitter and a discard timer DT is activated. The discard timers DT serve to define the maximum delay time set in the RLC entities.

In ③, the receiver receives PDU3 and recognizes that PDU2 having a sequence number smaller than that of PDU3 dose not arrive yet. In order to check whether the reception failure is generated due to the inversion of transfer order of the HARQ, the receiver starts the HARQ jitter timer JT.

In ④, when the HARQ jitter timer JT expires, the receiver reports to the transmitter that it does not receive PDU2. At the same time, in order to prevent the report from being lost, a periodic timer PT for PDU2 is activated.

In ⑤, the transmitter receives the report transmitted from the receiver. Since the discard timer DT for SDU1 does not expire yet, the transmitter retransmits PDU2.

In ⑥, the discard timer DT for SDU1 expires. The pieces of SDU1 are not transmitted any more. At this time, the transmitter may inform the receiver that the discard timer DT for SDU1 expires and thus it does not transmit the pieces of SDU1 any more. It is possible to prevent waste of radio resources by preventing an unnecessary retransmission request.

In ⑦, the periodic timer PT for PDU2 expires. Since the receiver does not receive PDU2 hitherto, the receiver transmits the status report information for PDU2 again. The periodic timer PT may be activated again at the same time of transmitting the status report information.

In ⑧, since the transmitter receives the status report information transmitted from the receiver again but the transmitter discards SDU1 due to the expiration of the discard timer DT, PDU2 is not retransmitted any more.

In ⑨, a release timer RT for SDU2 expires in the receiver. The release timer RT is activated when the successfully reconstructed SDU cannot be sent to a higher-level layer because an SDU having a sequence number smaller than that thereof does not arrive at the receiver. For example, the receiver successfully receives SDU2 by receiving a part of PDU3, PDU4, and PDU5, the receiver does not complete the reception of SDU1 having a sequence number smaller than that of SDU2 because not receiving PDU2. At the time of receiving SDU2, the release timer RT is activated. The release timer RT is used to prevent a certain SDU from staying in the buffer of the receiver too long. When the release timer RT expires, the receiver sends succeeded SDU2 to a higher-level layer and does not wait for failed SDU1 or PDUs associated the failed SDU (PDU2) any more. Since not waiting PDU2 any more, the periodic timer PT is also stopped.

It is possible to manage the retransmission request by the use of only the buffer of the RLC layer without using the buffer of the MAC layer.

The ARQ used here may be a NACK based system. The NACK based system is effective when data are steadily transmitted. More fine operations are required in consideration of transmission of packets or user data transmitted intermittently or the final SDU or PDU of a certain data flow. The NACK based system can be used when certain data is not received and the reception failure is checked by the receiver.

The receiver transmits the status report information as information on data not received. When the transmission of data is intermittent, that is, when the size of data is very small, the receiver may not know the transmission of data itself and the receiver cannot thus transmit the status report information. In this case, the receiver needs to report the transmitter that the receiver receives the data successfully. The transmitter also needs to request the receiver to transmit the status report information. In an exemplary embodiment, a PDU may contain a command for requesting the receiver to transmit the status report information. In another exemplary embodiment, for the purpose of more rapid transmission, the transmitter may directly command the receiver to transmit a report through a physical channel through which the scheduling information is transmitted.

The receiver should transmit the status report information to the transmitter as soon as it receives the request for the status report information. When not receiving the status report information within a predetermined time, the transmitter can automatically retransmit the data. When the timer is used, the retransmission can be performed regardless of the status report information.

The present invention can be embodied in hardware, software, or combinations thereof. Examples of the hardware can include an ASIC (Application Specific Integrated Circuit), a DSP (Digital Signal Processing), PLD (Programmable Logic Device), an FPGA (Field Programmable Gate Array), a processor, a controller, a micro processor, other electronic units, and combinations thereof, which are designed to perform the above-mentioned functions. In software, the invention can be embodied by modules for performing the above-mentioned functions. The software can be stored in a memory unit and executed by a processor. As the memory unit or processor, means well known to those skilled in the art can be employed.

Although the embodiments of the present invention have been described in detail with reference to the attached drawings, it should be understood by those skilled in the art that the invention can be modified and changed in various forms without departing from the technical spirit and scope of the invention. Accordingly, the invention is not limited to the above-mentioned embodiments, but includes all the embodiments without departing from the scope of the appended claims.

The invention to the claimed is:

1. A method of providing a status report of a Radio Link Control (RLC) layer in a wireless communication system, the method performed by a receiver and comprising:
   starting a timer when at least one missed RLC Protocol Data Unit (PDU) is detected;
   stopping the timer when the at least one missed RLC PDU is received from a transmitter while the timer is running;
   triggering the status report when the timer expires; and
   transmitting the status report to the transmitter, wherein the status report comprises a positive acknowledgement and a negative acknowledgement, the positive acknowledgement corresponding to an RLC PDU having a highest sequence number (SN) among successfully received RLC PDUs, and the negative acknowledgement indicating the at least one missed RLC PDU.

2. The method of claim 1, wherein the positive acknowledgement includes a SN following the SN of the successfully received RLC PDU.

3. The method of claim 1, wherein the negative acknowledgement comprises a SN of the at least one missed RLC PDU.

4. The method of claim 1, wherein the status report is constructed according to a total size of RLC PDUs indicated by a Medium Access Control (MAC) layer.

5. The method of claim 1, wherein the least one missed RLC PDU is detected when a SN following a SN of the RLC PDU with the highest SN among the successfully received RLC PDUs is larger than a SN following a last in-sequence received RLC PDU.

6. The method of claim 1, wherein the timer is stopped when a SN following the SN of the RLC PDU with the highest SN among the successfully received RLC PDUs when the timer was started is the same as a SN following a last in-sequence received RLC PDU.

7. A receiver comprising a Radio Link Control (RLC) entity for providing a status report to a RLC entity of a transmitter, wherein the RLC entity of the receiver is configured to:
   start a timer when at least one missed RLC Protocol Data Unit (PDU) is detected;
   stop the timer when the at least one missed RLC PDU is received from the transmitter while the timer is running;
   trigger the status report when the timer expires; and
   transmit the status report to the transmitter, wherein the status report comprises a positive acknowledgement and a negative acknowledgement, the positive acknowledgement corresponding to an RLC PDU having a highest sequence number (SN) among successfully received RLC PDUs, and the negative acknowledgement indicating the at least one missed RLC PDU.

8. The receiver of claim 7, wherein the positive acknowledgement includes a SN following the SN of a successfully received RLC PDU.

9. The receiver of claim 7, wherein the negative acknowledgement comprises a SN of the at least one missed RLC PDU.

10. The receiver of claim 7, wherein the status report is constructed according to a total size of RLC PDUs indicated by a Medium Access Control (MAC) layer.

11. The receiver of claim 7, wherein the least one missed RLC PDU is detected when a SN following a SN of the RLC PDU with the highest SN among the successfully received RLC PDUs is larger than a SN following a last in-sequence received RLC PDU.

12. The receiver of claim 7, wherein the timer is stopped when a SN following a SN of the RLC PDU with the highest SN among the successfully received RLC PDUs when the timer was started is the same as a SN following a last in-sequence received RLC PDU.

* * * * *